(12) United States Patent
Jiang

(10) Patent No.: US 10,582,521 B2
(45) Date of Patent: Mar. 3, 2020

(54) APPARATUS, METHOD AND COMPUTER PROGRAM PRODUCT FOR MEDIUM ACCESS CONTROL IN A WIRELESS SENSOR NETWORK

(71) Applicant: Nokia Technologies Oy, Espoo (FI)

(72) Inventor: Jian Jiang, Wuxi (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/753,961

(22) PCT Filed: Aug. 21, 2015

(86) PCT No.: PCT/CN2015/087748
§ 371 (c)(1),
(2) Date: Feb. 20, 2018

(87) PCT Pub. No.: WO2017/031623
PCT Pub. Date: Mar. 2, 2017

(65) Prior Publication Data
US 2018/0270843 A1    Sep. 20, 2018

(51) Int. Cl.
*H04W 72/12* (2009.01)
*H04W 52/02* (2009.01)
(Continued)

(52) U.S. Cl.
CPC ............. *H04W 72/12* (2013.01); *H04W 4/38* (2018.02); *H04W 52/0219* (2013.01); *H04W 84/18* (2013.01)

(58) Field of Classification Search
CPC ... H04W 72/12; H04W 4/38; H04W 52/0216; H04W 52/0219; H04W 84/18;
(Continued)

(56) References Cited

U.S. PATENT DOCUMENTS 8,107,397 B1 * 1/2012 Bagchi .................. H04L 9/0822
370/254
9,526,062 B2 * 12/2016 Chebbo ................. H04W 40/32
(Continued)

FOREIGN PATENT DOCUMENTS

CA       2808502 A1    3/2012
CN     101242241 A     8/2008
(Continued)

*Primary Examiner* — Jay P Patel
(74) *Attorney, Agent, or Firm* — Mintz Levin Cohn Ferris Glovsky and Popeo, P.C.

(57) ABSTRACT

Method, apparatus, computer program product and computer readable medium are disclosed for medium access control in a wireless sensor network, wherein the wireless sensor network comprises a source node configured to send sensor information, a relay node configured to relay the sensor information and a sink node configured to receive the sensor information; said method comprising. The method comprises: scheduling wireless resource for the source node and the relay node so that the relay node can receive and relay the sensor information sent by the source node; and combining a plurality of transmissions containing the sensor information from the source node and/or the relay node in decoding the sensor information.

20 Claims, 9 Drawing Sheets

500

502

Scheduling wireless resource for the source node and the relay node so that the relay node can receive and relay the sensor information sent by the source node

504

Combining a plurality of transmissions containing the sensor information from the source node and/or the relay node in decoding the sensor information

(51) Int. Cl.
*H04W 4/38* (2018.01)
*H04W 84/18* (2009.01)

(58) Field of Classification Search
CPC ..... H04L 67/04; H04L 67/2814; H04L 67/32; H04L 67/12; Y02D 70/00
See application file for complete search history.

(56) References Cited

U.S. PATENT DOCUMENTS

| | | | |
|---|---|---|---|
| 2006/0178150 A1* | 8/2006 | Kim | H04L 45/48 455/445 |
| 2009/0141666 A1* | 6/2009 | Jin | H04B 7/2606 370/315 |
| 2010/0008256 A1* | 1/2010 | Chebbo | H04W 40/32 370/254 |
| 2010/0254302 A1* | 10/2010 | Jung | H04W 52/0219 370/315 |
| 2012/0218926 A1* | 8/2012 | Wang | H04W 52/0216 370/311 |
| 2013/0128786 A1* | 5/2013 | Sultan | H04W 52/0238 370/311 |
| 2014/0241254 A1 | 8/2014 | Kaur et al. | |
| 2015/0036570 A1 | 2/2015 | Jeong et al. | |
| 2015/0173021 A1* | 6/2015 | Lim | H04W 52/0241 370/311 |

FOREIGN PATENT DOCUMENTS

| | | | | |
|---|---|---|---|---|
| CN | 104302010 A | 1/2015 | | |
| WO | WO 2010127394 | * 11/2010 | ............. | H04L 12/54 |

\* cited by examiner

502

Scheduling wireless resource for the source node and the relay node so that the relay node can receive and relay the sensor information sent by the source node

504

Combining a plurality of transmissions containing the sensor information from the source node and/or the relay node in decoding the sensor information

600

602

Receiving scheduling information from the sink node, wherein the scheduling information comprises information about wireless resource scheduled to the source node

604

Sending the sensor information with the scheduled wireless resource

Receiving scheduling information from the sink node, wherein the scheduling information comprises information about wireless resource scheduled to the source node and the relay node respectively

704

Receiving the sensor information from the source node

706

Forwarding the sensor information to the sink node

Fig.7

APPARATUS, METHOD AND COMPUTER PROGRAM PRODUCT FOR MEDIUM ACCESS CONTROL IN A WIRELESS SENSOR NETWORK

This application is a national-phase entry of Patent Cooperation Treaty Application No. PCT/CN2015/087748, entitled "APPARATUS, METHOD AND COMPUTER PROGRAM PRODUCT FOR MEDIUM ACCESS CONTROL IN A WIRELESS SENSOR NETWORK," which has an international filing date of Aug. 21, 2015, the contents of which is hereby incorporated by reference in its entirety.

FIELD OF THE INVENTION

Embodiments of the disclosure generally relate to wireless communication, and more particularly, to medium access control (MAC) in a wireless sensor network.

BACKGROUND

A wireless sensor network (WSN) may include numerous sensor nodes distributed over an area to collect information. The sensor nodes may communicate among them through a wireless channel to self-organize into a multi-hop network and forward the collected data towards a sink node. Some example sensing components may include temperature sensors, accelerometers, humidity sensors, pressure sensors, magnetic sensors, as well as chemical sensors.

Because of the difficulty to recharge or replace the battery of each sensor node in the WSN, the energy efficiency of the WSN is a major issue and power consumption is an important design factor for the WSN. Moreover, efficient design of MAC protocol is a major factor in deciding the power consumption in the WSN. Thus, an improved MAC solution is desirable in the WSN.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for medium access control in a wireless sensor network, wherein the wireless sensor network comprises a source node configured to send sensor information, a relay node configured to relay the sensor information and a sink node configured to receive the sensor information. Said method may comprise: scheduling wireless resource for the source node and the relay node so that the relay node can receive and relay the sensor information sent by the source node; and combining a plurality of transmissions containing the sensor information from the source node and/or the relay node in decoding the sensor information.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to another aspect of the present disclosure, it is provided a non-transitory computer readable medium having encoded thereon statements and instructions to cause a processor to execute the above-described method.

According to another aspect of the present disclosure, it is provided an apparatus for medium access control in a wireless sensor network, wherein the wireless sensor network comprises a source node configured to send sensor information, a relay node configured to relay the sensor information and a sink node configured to receive the sensor information. Said apparatus may comprise: a scheduling element configured to schedule wireless resource for the source node and the relay node so that the relay node can receive and relay the sensor information sent by the source node; and a combining element configured to combine a plurality of transmissions containing the sensor information from the source node and/or the relay node in decoding the sensor information.

According to another aspect of the present disclosure, it is provided a method for medium access control in a wireless sensor network, wherein the wireless sensor network comprises a source node configured to send sensor information, a relay node configured to relay the sensor information and a sink node configured to receive the sensor information. Said method may comprise: receiving scheduling information from the sink node, wherein the scheduling information comprises information about wireless resource scheduled to the source node; and sending the sensor information with the scheduled wireless resource.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to another aspect of the present disclosure, it is provided a non-transitory computer readable medium having encoded thereon statements and instructions to cause a processor to execute the above-described method.

According to another aspect of the present disclosure, it is provided an apparatus for medium access control in a wireless sensor network, wherein the wireless sensor network comprises a source node configured to send sensor information, a relay node configured to relay the sensor information and a sink node configured to receive the sensor information. Said apparatus may comprise: a receiving element configured to receive scheduling information from the sink node, wherein the scheduling information comprises information about wireless resource scheduled to the source node; and a sending element configured to send the sensor information with the scheduled wireless resource.

According to another aspect of the present disclosure, it is provided a method for medium access control in a wireless sensor network, wherein the wireless sensor network comprises a source node configured to send sensor information, a relay node configured to relay the sensor information and a sink node configured to receive the sensor information. Said method may comprise: receiving scheduling information from the sink node, wherein the scheduling information comprises information about wireless resource scheduled to the source node and the relay node respectively; receiving the sensor information from the source node; and forwarding the sensor information to the sink node.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to another aspect of the present disclosure, it is provided a non-transitory computer readable medium having encoded thereon statements and instructions to cause a processor to execute the above-described method.

According to another aspect of the present disclosure, it is provided a apparatus for medium access control in a wireless sensor network, wherein the wireless sensor network comprises a source node configured to send sensor information, a relay node configured to relay the sensor information and a sink node configured to receive the sensor information. Said apparatus may comprise: a receiving element configured to receive scheduling information from the sink node, wherein the scheduling information comprises information about wireless resource scheduled to the source node and the relay node respectively, and receive the sensor information from the source node; and a forwarding element configured to forward the sensor information to the sink node.

These and other objects, features and advantages of the disclosure will become apparent from the following detailed description of illustrative embodiments thereof, which is to be read in connection with the accompanying drawings.

BRIEF DESCRIPTION OF THE DRAWINGS

FIG. 6 is a flow chart depicting a process for medium access control according to an embodiment of the present disclosure;

FIG. 7 is a flow chart depicting a process for medium access control according to an embodiment of the present disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In a WSN, due to large number of sensor nodes deployed in the network, packet collisions among nodes may happen and cause nodes to retransmit, which leads to wastage of the battery power. Moreover, environments of the WSN are often tough. For example, the place may be in harsh physical conditions; interferences may be strong; and thus the transmission channel may be of bad quality and data transmission may get corrupt from time to time. As a result, data packets may have to be discarded, and retransmissions may have to be requested. This increases the energy consumption in the WSN. Furthermore, the delay in packet delivery may increase due to retransmission.

To avoid or mitigate at least some of the above problems, an embodiment is disclosed to provide a solution for medium access control in a wireless sensor network.

Figure 1:
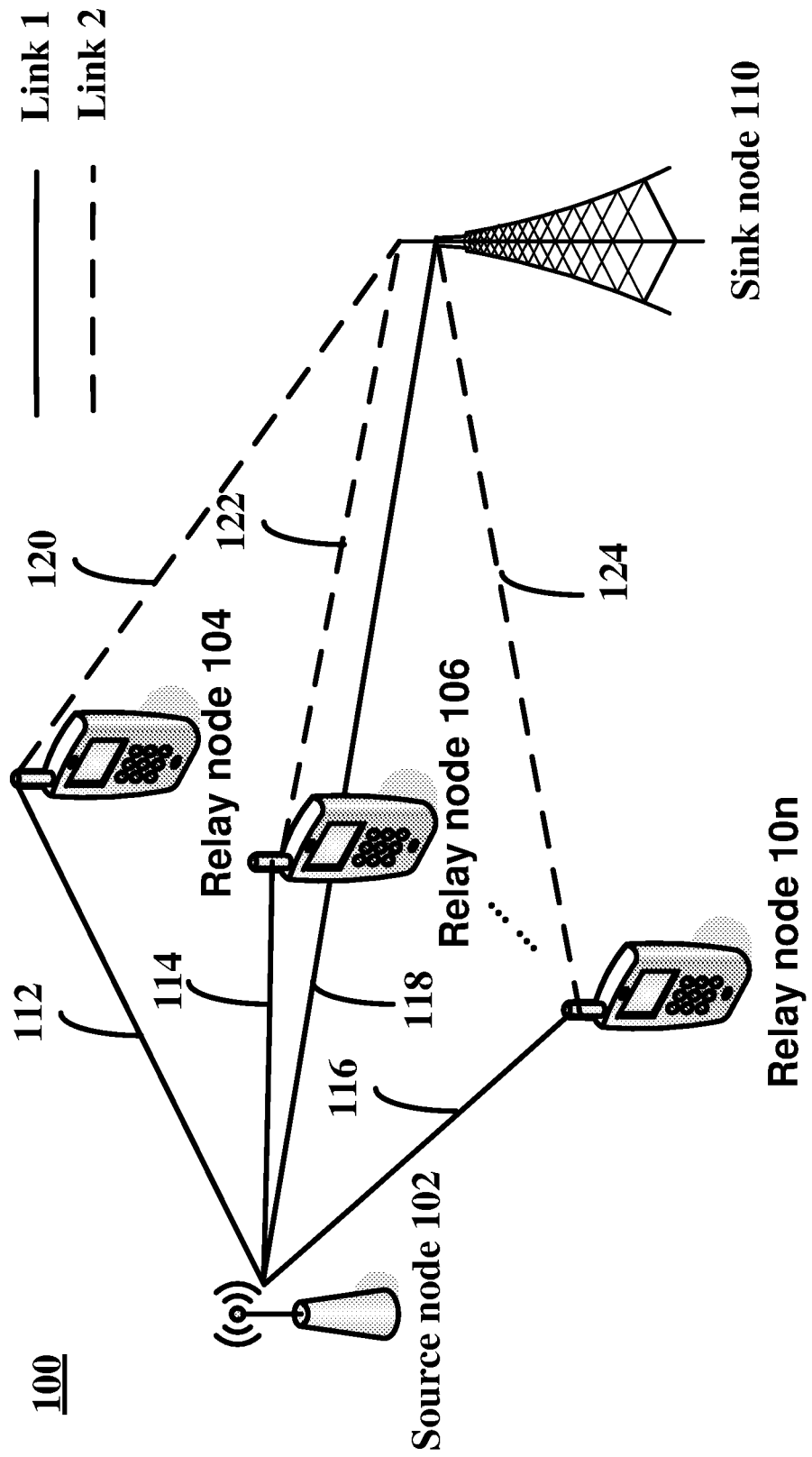
FIG. 1 shows a schematic system, in which some embodiments of the present disclosure can be implemented.

FIG. 1 depicts a schematic system, in which some embodiments of the present disclosure can be implemented. As shown in FIG. 1, the system 100 may comprise one or more relay nodes 104-10$n$ each operably connected to a source node 102 through a wireless link, such as 112, 114 and 116, and connected to a sink node 110 through another wireless link, such as 120, 122 and 124. The relay nodes 104-10$n$ can be any kind of sensors such as temperature sensors, accelerometers, humidity sensors, pressure sensors, magnetic sensors, as well as chemical sensors. In an embodiment, the relay nodes 104-10$n$ can be any kind of user equipments or computing devices that can wirelessly communicate with the source node 102 and the sink node 110, including, but not limited to, smart phones, tablets, laptops, running with any kind of operating system including, but not limited to, Windows, Linux, UNIX, Android, iOS and their variants. The relay nodes 104-10$n$ can be fixed or moveable. In some particular embodiments, at least some of the relay nodes 104-10$n$ can directly communicate with the sink node 110. In some particular embodiments, the quality of wireless channel between the sink node 110 and the relay nodes 104-10$n$ is too poor such that the sink node 110 cannot correctly decode the data from the relay nodes 104-10$n$. In some particular embodiments, the relay nodes 104-10$n$ are configured to relay sensor information from the source node 102.

The system 100 may comprise one or more source nodes. In the example of FIG. 1, only one source node is shown, i.e. source node 102. The source node 102 can comprises any kind of sensors such as temperature sensors, accelerometers, humidity sensors, pressure sensors, magnetic sensors, as well as chemical sensors. In this embodiment, the source node 102 can be any kind of sensor-embedded devices, including, but not limited to, mote, sensor node, terminal devices, computing devices, smart phones, and tablets. The source node 102 can obtain sensor information from its environment and send to the sink node 110. The source node 102 can be fixed or moveable. In a scenario, the source node 102 may be able to directly transmit data to the sink node 110 such as through a wireless link 118. In some particular scenarios, the source node 102 may be unable to directly transmit data to the sink node 110. Instead, it can transmit data to one or more of the relay nodes 104-10$n$. Additionally, the wireless channel between the source node 102 and the sink node 110 may be so poor that the sink node 110 cannot correctly decode the complete data from the source node 102.

The system 100 may further comprise a sink node 110 which is configured to receive sensor information and perform functions related to the medium access control. The sink node 110 can also perform additional functions, such as, node management functions and/or wireless resource management. The sink node 110 can be implemented in form of hardware, software or their combination, including but not limited to, a smart phone, a tablet, a laptop, a base station such as e.g. an eNB, a Home eNode B, femto Base Station, pico BS or any other node capable to serve the source node 102 and the relay nodes 104-10n in the system 100. The sink node 110 may be a stationary node or a mobile node. The sink node 110 may run with any kind of operating system including, but not limited to, Windows, Linux, UNIX, Android, iOS and their variants. In this embodiment, the sink node 110 is not subject to power restrictions. Namely, the sink node 110 can have its own power supply and transmit data with strong signals to other nodes in the WSN.

In some scenarios, the relay nodes 104-10n may also help forward data from the sink node 110 to the source node 102 or another relay node. Communications may be performed, for example, between the source node and a relay node, between two relay nodes, between the sink node and a relay node, and/or between the source node and the sink node. The source node, the relay nodes and the sink node may support one or several communication technologies. The terms for these nodes may vary depending on the contexts, technologies and terminologies.

It is noted that a node in the WSN may play multiple roles. For example, a relay node may also perform the functions of a source node, and a source node may act as a relay node if another source node requires it to relay some data. In addition, the sink node can also function as a relay node or source node, and a relay node can be elected as the sink node.

While the following embodiments are primarily discussed in the context of a two-hop WSN as shown in FIG. 1, it will be understood by those of ordinary skill that the disclosure is not so limited. In fact, the various aspects of this disclosure are useful in any WSN that can benefit from the medium access control as is described herein.

In this embodiment, like other wireless communication system, when a node (such as the source node 102 or a relay node) desires to access a WSN, it may transmit (or broadcast) an access request to a management or access node. In this embodiment, the management node is the sink node 110. The access request may include any suitable information. For example, the access request may be a preamble like that used in a cellular communication system. Details of the preamble in a 3G system are described in, inter alia, sections 5.7.2/5.7.3 of 3GPP TS 36.211, which is incorporated herein by reference in its entirety.

Figure 8:
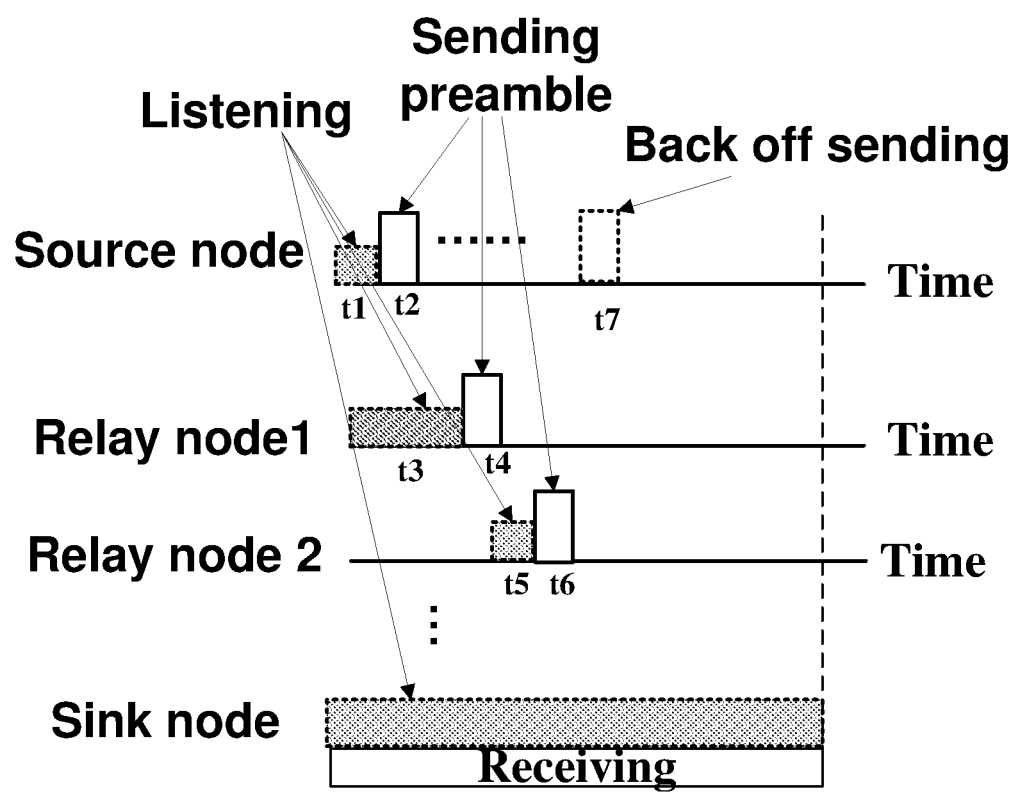
FIG. 8 is a schematic diagram of MAC protocol initialization phase according to an embodiment of the present disclosure.

FIG. 8 shows a schematic diagram of MAC protocol initialization phase according to an embodiment of the present disclosure. As shown in FIG. 8, the network comprising the source node, the relay nodes 1, 2 and the sink node is a contention-based WSN. In this phase, the source node and the relay nodes may communicate with the sink node by sending an access request, such as a preamble. The procedure is as follows:

(1) The source node may send or broadcast the preamble at time period t2. In an embodiment, the preamble may include identification (ID) information of the source node. The preamble may be received by the relay nodes 1, 2 or possibly by the sink node. Additionally, before sending the preamble, the source node may check the media to see whether it is free or not at a time period t1. It may listen to the media for the time period t1. If packet transmission is detected, the source node may back off its packet transmission for a random period of time and try again, for example, at a time period t7.

(2) The relay node 1 listens to the media for the time period t3. During this time period t3, it may receive the preamble from the source node and decode it. Then the relay node 1 can forward the preamble at time period t4. In this embodiment, this forwarded preamble can include the IDs of both the relay node 1 and the source node. Alternatively, the relay node 1 can also send its preamble including the ID of itself. In other word, in this alternative scenario, the relay node 1 may not forward the preamble from the source node. In the same manner, the relay node 2 and/or any other suitable relay nodes may perform similar actions as the relay node 1. Similarly, if the media is busy, the relay nodes 1 or 2 may back off and try again.

(3) At this phase, the sink node listens to the media all the time for the preambles from the relay node 1, 2 and possibly from the source node. The sink node may receive or infer information from the preambles.

When the sink node 110 has received the access requests such as preambles from the source node 102 and relay nodes 104-10n, it can determine for example whether the source node 102 and the relay nodes 104-10n are allowed to access the WSN. If allowed, then it may schedule wireless resources to the source node 102 and the relay nodes 104-10n.

Figure 2:
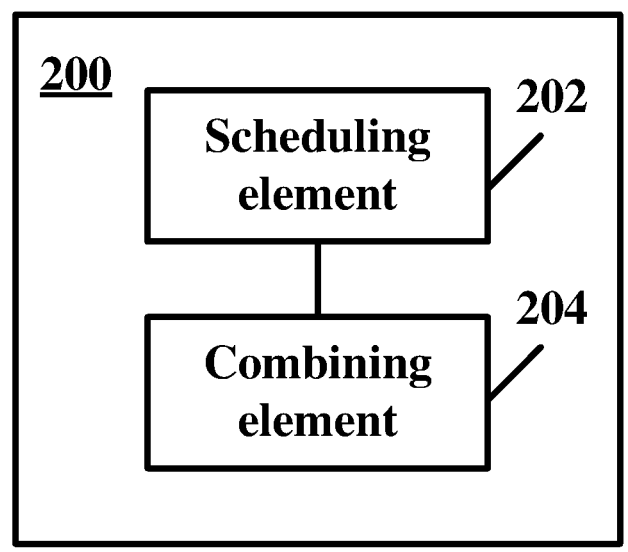
FIG. 2 is a simplified block diagram illustrating an apparatus according to an embodiment of the present disclosure.

FIG. 2 shows a simplified block diagram of an apparatus 200 for medium access control in a wireless sensor network according to an embodiment of the present disclosure. As described above, the wireless sensor network may comprise a source node configured to send sensor information, a relay node configured to relay the sensor information and a sink node configured to receive the sensor information. The apparatus 200 can be implemented as a part of the sink node, such as, the sink node 110 in FIG. 1.

In this embodiment, the apparatus 200 may include a receiving element (not shown) configured to receive an access request including identification information of the source node. For example, the receiving element can directly receive the access request from the source node if the source node has sent the access request with normal or boosted power. Additionally, the receiving element may be further configured to receive a relayed access request including identification information of both the source node and the relay node. As described above, an access request may be sent by the source node with normal power, and then be received by the relay node where it cannot reach the sink node. In this case, the relay node can forward the access request and include the identification information of both the source node and the relay node in the relayed access request. Thus, the apparatus 200 can obtain the identification information of the source node and the relay node from the relayed access request.

Further, the identification information can also indicate node type, such as source node or relay node. As an example, the identification information may comprise an IPv6 address. An operator of the WSN can also allocate any other suitable identification information for a sensor or node. Thus, the apparatus 200 may determine the node type based on the identification information. For example, the apparatus 200 may store a mapping list of the node type and the identification information and use the mapping list to determine the node type. Alternatively, the apparatus 200 can also retrieve the node type from an external database including the correlation of the node type and the identification.

Moreover, the apparatus 200 can use the access request to determine the latency between the apparatus 200 and the node sending the access request. For example, the preamble in some cellular communication systems can be used for this purpose.

Furthermore, the apparatus 200 can include an estimator (not shown) configured to estimate the channel condition between the apparatus 200 and the source or relay node based on the access request. For example, a source or relay node may indicate its transmitting power level in the access request. Thus, the estimator can use this information to infer the channel condition between it and the source or relay node. Other existing or future technologies can also be used to estimate the channel condition in the WSN.

In this embodiment, when the apparatus 200 has received the access requests from multiple candidate relay nodes, it may select the target relay nodes from the candidates. A selecting element (not shown) can be configured to select target relay nodes when receiving access requests from multiple candidate relay nodes. For example, as described above, the estimator can estimate the latency between itself and a potential relay node. If the apparatus 200 cannot directly receive data from the source node and can receive qualified data from some candidate relay nodes, then the selecting element can select those with the larger latency as the target relay nodes because those nodes may be located closer to the source node. The selecting element can also select those nodes with better channel qualities as the target relay nodes. It is noted that the selecting element can also use any other suitable approaches to select the target relay nodes. After completing the selection of the target relay nodes, a broadcasting element can be configured to broadcast information about the selection result to the source and the candidate relay nodes. For example, the information can contain the IDs of the target relay nodes. When a candidate relay node has received this information, it can decode this information and check IDs in it to know whether it has been selected or not. For example, a candidate relay node may know that it has been selected as a relay node if there is its ID in the broadcasted information.

When the apparatus 200 has received the access requests from the source node and the relay node and decide to allow them to transmit data, the apparatus 200 may schedule wireless resource for the source node and the relay node, so that the relay node can receive and relay the sensor information sent by the source node. The scheduling element 202 as shown in FIG. 2 can be configured to schedule wireless resource for the source node and the relay node so that the relay node can receive and relay the sensor information sent by the source node.

The wireless resource may comprise a plurality of timeslots, frequencies, spread codes, or other type of wireless resource. For example, the source and relay nodes in the wireless sensor network may use different timeslots, frequencies, spread codes to transmit or forward data. As an example, in time division multiplexing (TDM), the nodes may be scheduled to use different timeslots. In frequency division multiplexing (FDM), different frequency bands may be assigned to different nodes. In orthogonal frequency division multiplexing (OFDM), different OFDM subcarriers may be allocated to different nodes. In code division multiplexing (CDM), different nodes may use different spread codes.

In this embodiment, the scheduling element 202 may schedule wireless resource for the source node and the relay node based on node type, so that the relay node can receive and relay the sensor information sent by the source node. For example, as described above, when receiving an access request including identification information, the apparatus 200 can know the node type of each node, namely whether it is a source or relay node. Then the scheduling element 202 can schedule wireless resource for the source node and the relay node based on node type. As an example, assuming that the wireless resource comprises timeslots, the scheduling element 202 can allocate timeslot 1 and timeslot 4 to the source node, wherein the timeslot 1 may be configured to send sensor information and the timeslot 4 may be configured to receive data (such as acknowledgement (ACK)) from the apparatus 200. The scheduling element 202 may allocate timeslots 1, 3 and 4 to a relay node, wherein the timeslot 1 may be configured to receive the sensor information from the source node, the timeslot 3 may be configured to send the sensor information received from the source node, the timeslot 4 may be configured to receive data (such as ACK) from the apparatus 200. In this scenario, the apparatus 200 can listen to the wireless channel at timeslots 1, 2 and 3, and transmit ACK at timeslot 4 to the source node and the relay node.

In general, when the scheduling element 202 schedules wireless resource to the source node for sending the sensor information at a time period $T_1$, it may indicate the relay node and itself to listen to the wireless channel during that time period $T_1$. When the scheduling element 202 schedules a wireless resource to a relay node for forwarding the sensor information received from the source node at a time period $T_2$, it may listen to the wireless channel and indicate the source node to enter into sleeping mode during that time period $T_2$. When the scheduling element 202 needs to send data (such as ACK) at a time period $T_3$, it may indicate the source node and/or the relay node to listen to the wireless channel during that time period $T_3$. The source node and/or the relay node may need to wake up to receive the ACK at that time period $T_3$.

In another embodiment, the scheduling element 202 can schedule different quantity wireless resources for every relay node. With timeslot as an example, the scheduling element 202 can allocate more timeslots (such as two timeslots) for a relay node with best wireless channel quality to allow this relay node transmit more (such as two) copies of the sensor information from the source node, while assign less timeslots (such as one timeslot) for another relay node with the worst wireless channel quality to cause this another relay node to transmit less (such as one) copies of the sensor information.

In an embodiment, the source node and the relay node can always use the same wireless resource to transmit and/or receive information. With timeslot as an example, if there are eight timeslots for transmitting information in a frame and the source node is scheduled to use timeslot 1 to transmit information, then the source node can always use the timeslot 1 to transmit information until the scheduling element 202 has allocated another wireless resource for transmission. In another embedment, the scheduling element 202 can schedule different wireless resource for transmitting each information chunk.

After scheduling the wireless resource for the source node and the relay node, the apparatus 200 can notify the source node and the relay node of respective wireless resources. In an embodiment, a notifying element (not shown) of apparatus 200 can be configured to notify the source node and the relay node of their scheduled wireless resources through broadcast. For example, the notifying element can notify the source node and the relay node of their scheduled wireless resources in a broadcast channel in the WSN. In other embodiments, if the apparatus 200 has allocated a dedicated channel to the source node and the relay node respectively, then the notifying element can notify the source node and the relay node of respective wireless resources by using their respective dedicated channels.

It is noted that if the scheduling element 202 does not allocate any wireless resource for a relay node, it may mean that this relay node may not be selected as the target relay node. In other word, the apparatus 200 can implicitly inform which relay nodes are selected as the target relay nodes in this way. As an example, the apparatus 200 may not broadcast information about the selection result to the source and the candidate relay nodes after completing the selection of the target relay nodes, but broadcast the information regarding the respective wireless resources of the source node and the target relay nodes. Then, a candidate relay node can receive and decode this information to check whether it has been allocated wireless resource, for example to find wireless resource corresponding to its ID. A candidate relay node may be aware of that it has not been selected as a relay node if there is not corresponding wireless resource for it. Otherwise, the candidate relay node may know that it has been selected as a relay node.

After the source node and the relay node have known their respective wireless resources, they can transmit and/or receive and/or enter into sleeping mode and/or wake up based on their respective wireless resources. For example, the source node can send sensor information at its scheduled wireless resources, and the relay node and apparatus 200 can receive the sensor information meanwhile, then the relay node can forward the sensor information to the apparatus 200 at its scheduled wireless resource. Therefore, the apparatus 200 may receive multiple sensor information from the source node and/or one or more relay nodes.

After the apparatus 200 has received a plurality of transmissions containing the sensor information from the source node and/or the relay node, it can combine the plurality of transmissions in decoding the sensor information. A combining element 204 as shown in FIG. 2 can be configured to combine a plurality of transmissions containing the sensor information from the source node and/or the relay node in decoding the sensor information. The combining element 204 can use any suitable combing technology, such as maximal-ratio combining (MRC), equal-gain combining, or selection combining.

In an embodiment, the combining element 204 may use hybrid automatic repeat request (HARQ) with chase combining to decode the sensor information from the source node and/or the relay node. In chase combining HARQ, every retransmission (i.e, the transmission forwarded by a relay node in this embodiment) may contain the same information (data and parity bits) as that transmitted by the source node. The combining element 204 may uses maximum-ratio combining to combine the received bits with the same bits from several transmissions. Because all transmissions are identical, chase combining can be seen as additional repetition coding. One could think of every re-transmission as adding extra energy to the received transmission through an increased $E_b/N_0$.

When the sensor information is successfully decoded, the apparatus 200 can send an acknowledgement to the source node and/or the relay node. A sending element (not shown) of the apparatus 200 can be configured to send an acknowledgement to the source node and/or the relay node when the sensor information is successfully decoded. The sending element can send the acknowledgement though broadcast. In an embodiment, the acknowledgement can also contain subsequent scheduled wireless resource for the source node and the relay node.

In an embodiment, if the sensor information is not successfully decoded, the sending element can send non-acknowledgement to the source node and/or the relay node. Then, for example the source node and/or the relay node may retransmit the sensor information.

Figure 9:
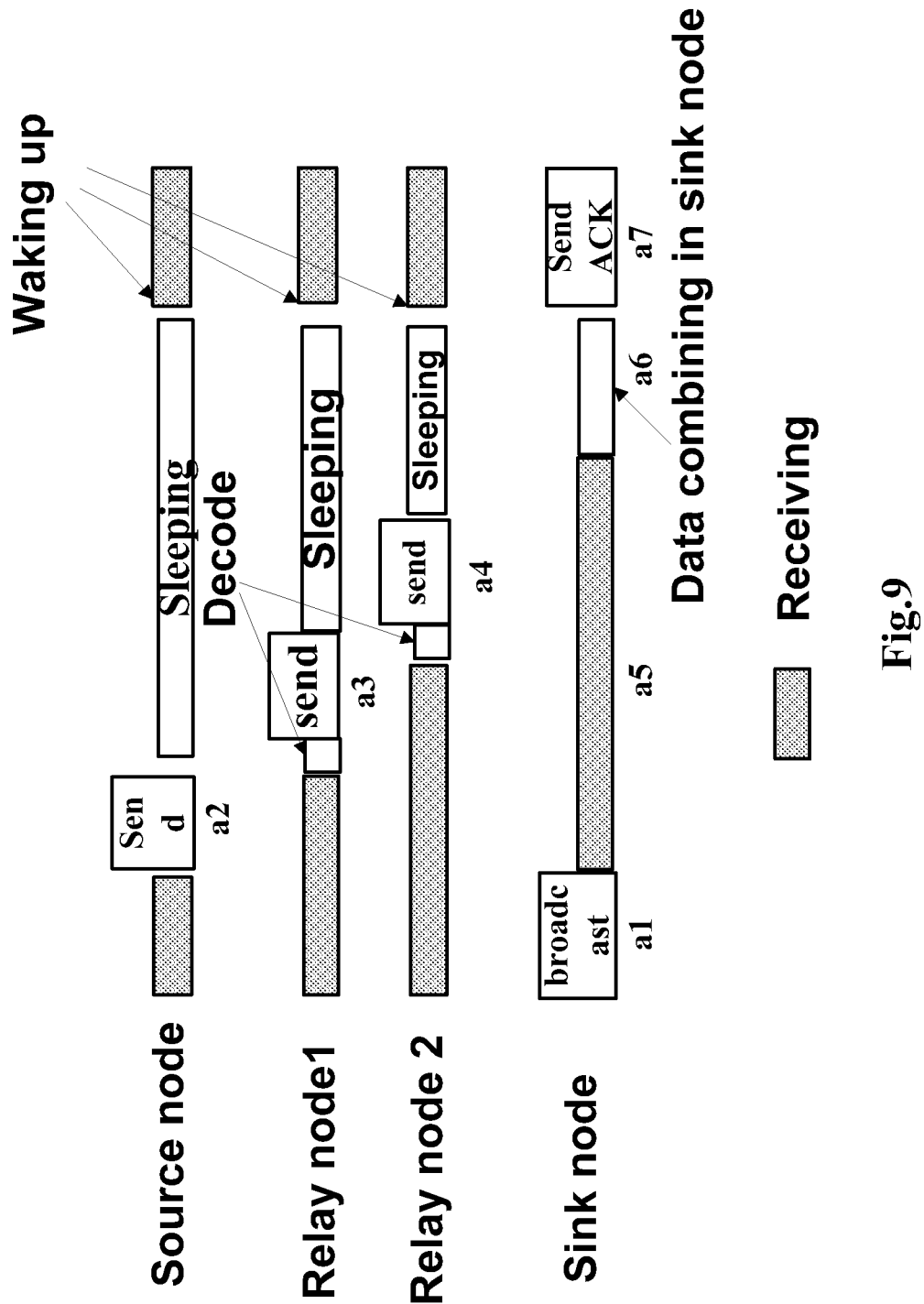
FIG. 9 is a schematic diagram of MAC protocol data transmission, decoding and feedback phase according to an embodiment of the present disclosure.

FIG. 9 shows a schematic diagram of MAC protocol data transmission, decoding and feedback phase according to an embodiment of the present disclosure. As shown in FIG. 9, the source node, the relay nodes 1, 2 and the sink node may be located in a contention-based WSN. At the time period a1, the sink node may notify the source node and the relay nodes 1, 2 of their scheduled wireless resources through broadcast. Then, the source node and the relay nodes 1, 2 can obtain their scheduled wireless resources since they listen to the channel at the time period a1. The source node is scheduled to send sensor information at the time period a2. At the same time period a2, the relay nodes 1, 2 and sink node may listen to the channel and receive the sensor information. After receiving the sensor information from the source node, the relay nodes 1, 2 can forward this sensor information to the sink node. In this embodiment, before forwarding, the relay node can decode the sensor information to perform error recovery and then send it. Noted that the relay node can transmit the sensor information even if it has not successfully decoded the sensor information. In another embodiment, the relay nodes 1, 2 can send the sensor information without decoding. In this way, it can save the power of the relay node. After the source node or the relay node have transmitted the sensor information, each of them can enter into a sleeping mode. At time period a5, the sink node can listen to the media and receive the identical sensor information from the source node and/or the relay nodes 1, 2. Then the sink node can combine a plurality of transmissions containing the sensor information from the source node and/or the relay node 1,2 in decoding the sensor information at time period a6, for example by using chase combining HARQ. If the sink node has successfully decoded the sensor information, then it may send an acknowledgement to the source node and/or the relay node 1, 2 at time period a7. At the time period a7, the source node and/or the relay node 1, 2 will wake up and receive the ACK. After receiving the ACK, the source node may send next data.

Figure 3:
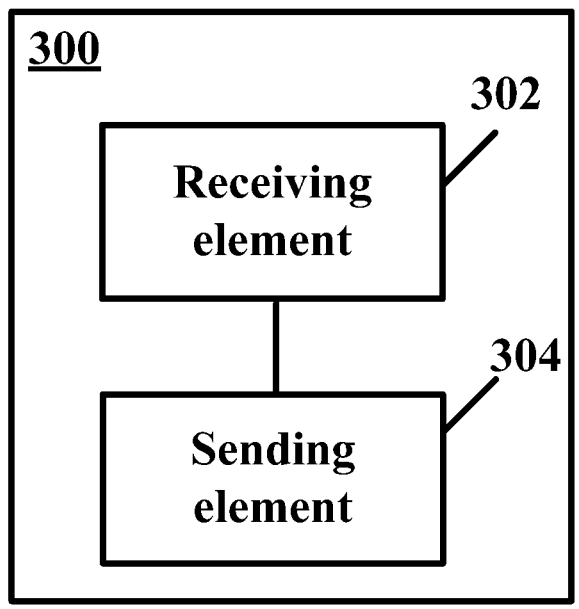
FIG. 3 is a simplified block diagram illustrating an apparatus according to an embodiment of the present disclosure.

FIG. 3 shows a simplified block diagram illustrating an apparatus 300 according to an embodiment of the present disclosure. As described above, the wireless sensor network may comprise a source node configured to send sensor information, a relay node configured to relay the sensor information and a sink node configured to receive the sensor information. The apparatus 300 can be implemented as a part of the source node, such as, the source node 102 in FIG. 1.

In this embodiment, the apparatus 300 may include a sending element 304 configured to send an access request with normal or boosted power. As mentioned above, the access request may include any suitable information. For example, the access request may be a preamble like that used in a cellular communication system. In another embodiment, the access request may include identification information of the source node.

In an embodiment, the sending element 304 may send or broadcast the access request with normal or boosted power. For example, the sending element 304 may send the access request with normal power to save power. In this case, the access request may not be directly received by the sink node, and the relay node may be configured to listen to the media, receive the access request, possibly decode it, and then forward it to the sink node. Noted that the forwarded access request may include the relay node's ID and the source node's ID. As another example, the sending element 304 may send the access request with boosted power. In this case, the access request may be directly received by the sink node, and the relay node may be configured to not forward the access request. Using which mechanism may depend on different factors, such as policy, design of the WSN or choice by the operator.

Then, as mentioned above, the sink node can obtain the identification information of the source node and the relay node and decide to allow them to transmit data. Then it may schedule wireless resource for the source node and the relay node so that the relay node can receive and relay the sensor information sent by the source node. When the sink node has sent the wireless resource such as by broadcast, the receiving element 302 of the apparatus 300 can receive scheduling information from the sink node, wherein the scheduling information comprises information about wireless resource scheduled to the source node. As mentioned above, the wireless resource may comprise a plurality of timeslots, frequencies or spread codes.

After obtaining the scheduled wireless resource, the sending element 304 may send the sensor information with the scheduled wireless resource. The sensor information may be relayed by the relay node as mentioned above. In an embodiment, the receiving element 302 may send the sensor information with normal power.

In an embodiment, the apparatus 300 can further comprise an entering element (not shown) configured to enter into a sleeping mode. For example, if the apparatus 300 is not required to send and/or receive data, then the entering element may let the apparatus 300 to enter into the sleeping mode. The sleeping mode can include multiple sleeping modes for example depending on the design of the node in the WSN, such as a deep sleeping mode or a light sleeping mode. Moreover, different nodes can have different sleeping modes.

As mentioned above, when the sink node has received a plurality of transmissions containing the sensor information from the source node and/or the relay node, it may combine a plurality of transmissions in decoding the sensor information. When it has successfully decoded the sensor information, the sink node may send an acknowledgement to the source node and/or the relay node. The receiving element 302 may be configured to receive the acknowledgement for the successful receipt of the sensor information.

Then the sending element 304 may send next sensor information after the receiving element has received the acknowledgement. For example, the sending element 304 may send the next sensor information with next scheduled wireless resource, such as next timeslot.

The apparatus 300 may further include a resending element (not shown) configured to resend the sensor information if the acknowledgement is not received within a predetermined period of time. For example, the apparatus 300 may maintain a timer. When the sending element 304 has sent the sensor information, the timer can be started. If the receiving element 302 has not received the ACK from the sink node after the timer has expired, the resending element may resend the sensor information. Then the relay node can receive and forward the resented sensor information to the sink node as mentioned above.

Figure 4:
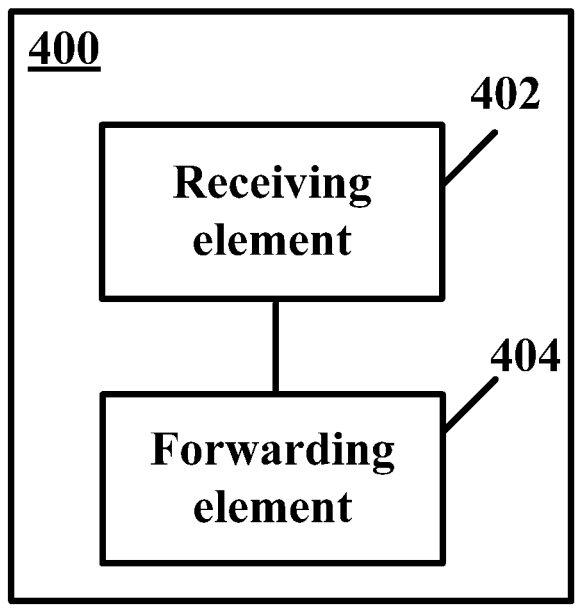
FIG. 4 is a simplified block diagram illustrating an apparatus according to an embodiment of the present disclosure.

FIG. 4 shows a simplified block diagram illustrating an apparatus 400 for medium access control in a wireless sensor network according to an embodiment of the present disclosure. As described above, the wireless sensor network may comprise a source node configured to send sensor information, a relay node configured to relay the sensor information and a sink node configured to receive the sensor information. The apparatus 400 can be implemented as a part of the relay node, such as, the relay node 104-10n in FIG. 1.

In this embodiment, the apparatus 400 may include a sending element (not shown) configured to send a first access request comprising identification information of the relay node. In addition, the first access request may also include any suitable information. For example, the access request may be a preamble like that used in a cellular communication system.

The apparatus 400 may further include a receiving element 402 configured to receive a second access request from the source node, wherein the access request comprises identification information of the source node. In addition, the second access request may also include any suitable information. For example, the access request may be a preamble like that used in a cellular communication system.

The apparatus 400 may further include a forwarding element 404 configured to forward the second access request to the sink node together with identification information of the relay node.

In some particular embodiment, as mentioned above, before sending the first or second access request, the apparatus 400 may check the media to see whether it is free or not. If packet transmission is detected, the relay node may back off its packet transmission for a random period of time and try again.

In another embodiment, the receiving element 402 is further configured to receive scheduling information from the sink node, wherein the scheduling information comprises information about wireless resource scheduled to the source node and the relay node respectively. After the source node has sent the sensor information with its scheduled wireless resource, the receiving element 402 may receive the sensor information from the source node with its scheduled wireless resource. As mentioned above, the wireless resource comprises a plurality of timeslots, frequencies or spread codes.

After the receiving element 402 has received the sensor information from the source node, the forwarding element 404 may forward the sensor information to the sink node, such as with scheduled wireless resource.

As an example, after the sending element has sent the first access request or the second access request, the apparatus 400 may listen to the media and receive the wireless resource scheduled to it, then it can continue to listen to the media or listen to the media with a scheduled wireless resource for receiving to receive the sensor information from the source node. Subsequently, the forwarding element may forward the sensor information to the sink node with scheduled wireless resources.

In an embodiment, after the sink node has sent the acknowledgement for the successful receipt of the sensor information, the receiving element 402 may receive the acknowledgement.

In an embodiment, the sending element may resend the sensor information if the acknowledgement is not received within another predetermined period of time. In this way, it can save the power of the source node.

According to various embodiments, the apparatus 200, 300 and 400 may further comprise a storage device (not shown) configured to store the sensor information, the information about the scheduled wireless resource, and any other information necessary for its functions. The storage device can be any kind of computer readable storage, such as a hard disk, SSD, a phase change memory (PCM), a random access memory (RAM), a read-only memory (ROM), an erasable programmable read-only memory (EPROM) or Flash memory.

Figure 5:
FIG. 5 is a flow chart depicting a process for medium access control according to an embodiment of the present disclosure.

Under the same inventive concept, FIGS. 5 to 7 are flow charts showing processes for medium access control according to some embodiments of the present disclosure. The present disclosure will be described below with reference to these figures. For same parts or functions as described in the previous embodiments, the description thereof is omitted for brevity.

FIG. 5 shows a process for medium access control in a wireless sensor network according to an embodiment of the present disclosure. As described above, the wireless sensor network comprises a source node configured to send sensor information, a relay node configured to relay the sensor information and a sink node configured to receive the sensor information. The process 500 can be performed by the apparatus 200 shown in FIG. 2.

In an embodiment, the process 500 may include a first receiving step for receiving an access request including identification information of the source node. For example, the receiving element can directly receive the access request from the source node if the source node has sent the access request with normal or boosted power. In another embodiment, the process 500 may include a second receiving step configured to receive a relayed access request including identification information of both the source node and the relay node. As described above, the access request may be sent by the source node with normal power, and then be received by the relay node where it cannot reach the sink node. In this case, the relay node can forward the access request and include the identification information of both the source node and the relay node in the relayed access request. Thus, the apparatus 200 can obtain the identification information of the source node and the relay node from the relayed access request.

Further, as mentioned above, the identification information can also indicate node type, such as source node or relay node. Thus, the process 500 may include a determining step to determine the node type based on the identification information.

After the apparatus 200 has received the access request, a determining step may be performed to determine the latency between the apparatus 200 and the node sending the access request based on the access request as described above.

Furthermore, the process 500 may include an estimating step to estimate the channel condition between the apparatus 200 and the source node or the relay node based on the access request as mentioned above.

In this embodiment, the process 500 may include a selecting step configured to select the target relay nodes from multiple candidate relay nodes, as mentioned above. After completing the selection of the target relay nodes, a broadcasting step may be performed to broadcast information about the selection result to the source and the candidate relay nodes as described above.

Then, the process 500 may proceed to a scheduling step 502. At step 502, the apparatus 200 may schedule wireless resource for the source node and the relay node so that the relay node can receive and relay the sensor information sent by the source node. As mentioned above, the wireless resource may comprise a plurality of timeslots, frequencies, spread codes, or other type of wireless resource.

In this embodiment, at step 502, the apparatus 200 may schedule wireless resource for the source node and the relay node based on node type, so that the relay node can receive and relay the sensor information sent by the source node as mentioned above.

In general, at step 502, when the apparatus 200 schedules wireless resource to the source node for sending the sensor information at a time period $T_1$, it may indicate the relay node and itself to listen to the wireless channel during that time period $T_1$. When the scheduling element 202 schedules a wireless resource to a relay node for forwarding the sensor information received from the source node at a time period $T_2$, it may listen to the wireless channel and indicate the source node to enter into sleeping mode during that time period $T_2$. When the scheduling element 202 needs to send data (such as ACK) at a time period $T_3$, it may indicate the source node and/or the relay node to listen to the wireless channel during that time period $T_3$. The source node and/or the relay node may need to wake up to receive the ACK at that time period $T_3$.

In another embodiment, at step 502, the apparatus 200 can schedule different quantity wireless resources for every relay node, as mentioned above.

In an embodiment, the source node and the relay node can always use the same wireless resource to transmit or receive, as mentioned above.

After scheduling the wireless resource for the source node and the relay node, the process 500 may proceed to a notifying step. At the notifying step, the apparatus 200 may notify the source node and the relay node of their scheduled wireless resources through broadcast, as mentioned above.

It is noted that if the apparatus 200 does not allocate any wireless resource for a relay node at the notifying step, it may mean that this relay node may not be selected as the true relay node. In other word, the apparatus 200 can implicitly inform which relay nodes are selected as the true relay nodes in this way as described above.

After the source node and the relay node have known their respective wireless resources, they can transmit and/or receive and/or enter into sleeping mode and/or wake up based on their respective wireless resources. For example, the source node can send sensor information at the scheduled wireless resources, and the relay node and apparatus 200 can receive the sensor information meanwhile, then the relay node can forward the sensor information to the apparatus 200 at its scheduled wireless resource. Therefore, the apparatus 200 may receive multiple sensor information from the source node and/or one or more relay nodes.

After the apparatus 200 has received a plurality of transmissions containing the sensor information from the source node and/or the relay node, the process 500 can proceed to step 504. At step 504, the apparatus 200 can combine the plurality of transmissions in decoding the sensor information. The apparatus 200 can use any suitable combing technology, such as maximal-ratio combining (MRC), equal-gain combining diversity, or selection combining.

In an embodiment, at step 504, the apparatus 200 may use hybrid automatic repeat request (HARQ) with chase combining to decode the sensor information from the source node and/or the relay node, as mentioned above.

When the sensor information is successfully decoded, the process 500 can proceed to a sending step. At the sending step, the apparatus 200 can send an acknowledgement to the source node and/or the relay node. The apparatus 200 can send the acknowledgement though broadcast. In an embodiment, the acknowledgement can also contain subsequent scheduled wireless resource for the source node and the relay node.

In another embodiment, if the sensor information is not successfully decoded, the apparatus 200 can send non-acknowledgement to the source node and/or the relay node at the sending step. Then, for example the source node and/or the relay node may retransmit the sensor information.

FIG. 6 shows a process for medium access control in a wireless sensor network according to an embodiment of the present disclosure. As mentioned above, the wireless sensor network comprises a source node configured to send sensor information, a relay node configured to relay the sensor information and a sink node configured to receive the sensor information. The process 600 can be performed by the apparatus 300 shown in FIG. 3.

The process 600 may include a first sending step. At the first sending step, the apparatus 300 may send an access request with normal or boosted power. As mentioned above, the access request may include any suitable information. For example, the access request may be a preamble like that used in a cellular communication system. In another embodiment, the access request may include identification information of the source node.

In an embodiment, at the first sending step, the apparatus 300 may send the access request with normal or boosted power. For example, the apparatus 300 may send the access request with normal power to save power at the first sending step. In this case, the access request may not be directly received by the sink node, and the relay node may be configured to listen to the media, receive the access request, possibly decode it, and then forward it to the sink node. Noted that the forwarded access request may include the relay node's ID and the source node's ID. As another example, at the first sending step, the apparatus 300 may send the access request with boosted power. In this case, the access request may be directly received by the sink node, and the relay node may be configured to not forward the access request. Using which mechanism may depend on different factors, such as policy, design of the WSN or choice by the operator.

Then, as mentioned above, the sink node can obtain the identification information of the source node and the relay node and decide to allow them to transmit data. Then it may schedule wireless resource for the source node and the relay node so that the relay node can receive and relay the sensor information sent by the source node.

Then the process 600 may proceed to a step 602. At the step 602, the apparatus 300 can receive scheduling information from the sink node, wherein the scheduling information comprises information about wireless resource scheduled to the source node. As mentioned above, the wireless resource may comprise a plurality of timeslots, frequencies or spread codes.

Then, the process 600 may proceed to a second sending step 604. At the second sending step 604, the apparatus 300 may send the sensor information with the scheduled wireless resource. The sensor information may be relayed by the relay node as mentioned above. In an embodiment, the apparatus 300 may send the sensor information with normal power.

In an embodiment, the process 600 can further comprise an entering step. At the entering step, the apparatus 300 may enter into a sleeping mode. For example, if the apparatus 300 is not required to send and/or receive data, then at the entering step, the apparatus 300 may enter into the sleeping mode. The sleeping mode can include multiple sleeping modes for example depending on the design of the node in the WSN, such as a deep sleeping mode or a light sleeping mode. Moreover, different nodes can have different sleeping modes.

As mentioned above, when the sink node has received a plurality of transmissions containing the sensor information from the source node and/or the relay node, it may combine a plurality of transmissions in decoding the sensor information. When the sink node has successfully decoded the sensor information, the sink node may send an acknowledgement to the source node and/or the relay node when the sensor information is successfully decoded. Then the process 600 may proceed to a second receiving step. At the second receiving step, the apparatus 300 may receive the acknowledgement from the sink node.

Then the apparatus 300 may send next sensor information after receiving the acknowledgement. For example, the apparatus 300 may send the next sensor information with next scheduled wireless resource, such as next timeslot.

In an embodiment where the acknowledgement is not received within a predetermined period of time, the process 600 may further include a resending step. At the resending step, the apparatus 300 may resend the sensor information, as mentioned above.

FIG. 7 shows a process for medium access control in a wireless sensor network according to an embodiment of the present disclosure As described above, the wireless sensor network may comprise a source node configured to send sensor information, a relay node configured to relay the sensor information and a sink node configured to receive the sensor information. The apparatus 400 can be implemented as a part of. The process 700 can be performed by the apparatus 400 shown in FIG. 4.

The process 700 may include a sending step. At the sending step, the apparatus 400 may send a first access request comprising identification information of the relay node. In addition, the first access request may also include any suitable information. For example, the access request may be a preamble like that used in a cellular communication system.

The process 700 may further include a first receiving step. At the first receiving step, the apparatus 400 may receive a second access request from the source node, wherein the access request comprises identification information of the source node. In addition, the second access request may also include any suitable information. For example, the access request may be a preamble like that used in a cellular communication system.

After receiving the second access request, the process 700 may proceed to a forwarding step. At the forwarding step, the apparatus 400 may forward the second access request to the sink node together with identification information of the relay node.

In some particular embodiment, as mentioned above, before sending the first or second access request, the apparatus 400 may check the media to see whether it is free or not. If packet transmission is detected, the relay node may back off its packet transmission for a random period of time and try again.

After sending the first or second access request, the process 700 may proceed to step 702. At step 702, the apparatus 400 may receive scheduling information from the sink node, wherein the scheduling information comprises information about wireless resource scheduled to the source node and the relay node respectively.

Then the process 700 may proceed to step 704. At step 704, the apparatus 400 may receive the sensor information from the source node with its scheduled wireless resource. As mentioned above, the wireless resource comprises a plurality of timeslots, frequencies or spread codes.

After the apparatus 400 has received the sensor information from the source node, the apparatus 400 may forward the sensor information to the sink node at step 706, such as with the scheduled wireless resource for forwarding.

As an example, after sending the first access request or the second access request, the apparatus 400 may listen to the media and receive the wireless resource scheduled to it at step 702, then it can continue to listen to the media or listen to the media at a scheduled wireless resource for receiving to receive the sensor information from the source node at step 704. Subsequently, at step 706, the apparatus 400 may forward the sensor information to the sink node with a scheduled wireless resources for transmitting.

In an embodiment, after the sink node has sent the acknowledgement for the successful receipt of the sensor information, the process 700 may proceed to a second receiving step. At second receiving step, the apparatus 400 may receive an acknowledgement.

In an embodiment, the process 700 may include a resending step. At the resending step, the apparatus 400 may resend the sensor information if the acknowledgement is not received within another predetermined period of time. In this way, it can save the power of the source node.

According to various embodiments, the process 500, 600 and 700 may further comprise a storing step. At the storing step, the apparatus 200, 300, 400 may store the sensor information, the information about the scheduled wireless resource, and any other information necessary for its functions.

It is noted that any of the components of the apparatus 200, 300, 400 depicted in FIG. 2-4 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

According to an aspect of the disclosure it is provided an apparatus for medium access control in a wireless sensor network, wherein the wireless sensor network comprises a source node configured to send sensor information, a relay node configured to relay the sensor information and a sink node configured to receive the sensor information. Said apparatus comprises means configured to schedule wireless resource for the source node and the relay node so that the relay node can receive and relay the sensor information sent by the source node; and means configured to combine a plurality of transmissions containing the sensor information from the source node and/or the relay node in decoding the sensor information.

According to an embodiment, the apparatus further comprises means configured to receive an access request including identification information of the source node.

According to an embodiment, the apparatus further comprises means configured to receive a relayed access request including identification information of the source node and the relay node.

According to an embodiment, wherein the wireless resource may comprise a plurality of timeslots, frequencies or spread codes.

According to an embodiment, the apparatus further comprises means configured to notify the source node and the relay node of their scheduled wireless resources through broadcast.

According to an embodiment, the apparatus further comprises means configured to send an acknowledgement to the source node and/or the relay node when the sensor information is successfully decoded.

According to an embodiment, wherein the relay node comprises a plurality of relay nodes.

According to an embodiment, the apparatus further comprises means configured to select target relay nodes when receiving access requests from multiple candidate relay nodes; and means configured to broadcast the selection result.

According to an embodiment, wherein hybrid automatic repeat request (HARQ) with chase combining is used to decode the sensor information.

According to another aspect of the disclosure it is provided an apparatus for medium access control in a wireless sensor network, wherein the wireless sensor network comprises a source node configured to send sensor information, a relay node configured to relay the sensor information and a sink node configured to receive the sensor information. Said apparatus comprises means configured to receive scheduling information from the sink node, wherein the scheduling information comprises information about wireless resource scheduled to the source node; and means configured to send the sensor information with the scheduled wireless resource.

According to an embodiment, said apparatus further comprises means configured to send an access request with normal or boosted power.

According to an embodiment, wherein the access request comprises identification information of the source node.

According to an embodiment, said apparatus further comprises means configured to receive an acknowledgement for the successful receipt of the sensor information.

According to an embodiment, said apparatus further comprises means configured to send next sensor information after it has received the acknowledgement.

According to an embodiment, said apparatus further comprises means configured to resend the sensor information if the acknowledgement is not received within a predetermined period of time.

According to an embodiment, said apparatus further comprises means configured to enter into a sleeping mode.

According to an embodiment, the wireless resource may comprise a plurality of timeslots, frequencies or spread codes.

According to another aspect of the disclosure it is provided an apparatus for medium access control in a wireless sensor network, wherein the wireless sensor network comprises a source node configured to send sensor information, a relay node configured to relay the sensor information and a sink node configured to receive the sensor information. Said apparatus comprises means configured to receive scheduling information from the sink node, wherein the scheduling information comprises information about wireless resource scheduled to the source node and the relay node respectively; means configured to receive the sensor information from the source node; and means configured to forward the sensor information to the sink node.

According to an embodiment, said apparatus further comprises means configured to send a first access request comprising identification information of the relay node.

According to an embodiment, said apparatus further comprises means configured to receive a second access request from the source node, wherein the access request comprises identification information of the source node; and means configured to forward the second access request to the sink node together with identification information of the relay node.

According to an embodiment, said apparatus further comprises means configured to receive an acknowledgement for the successful receipt of the sensor information.

According to an embodiment, wherein the wireless resource comprises a plurality of timeslots, frequencies or spread codes.

Figure 10:
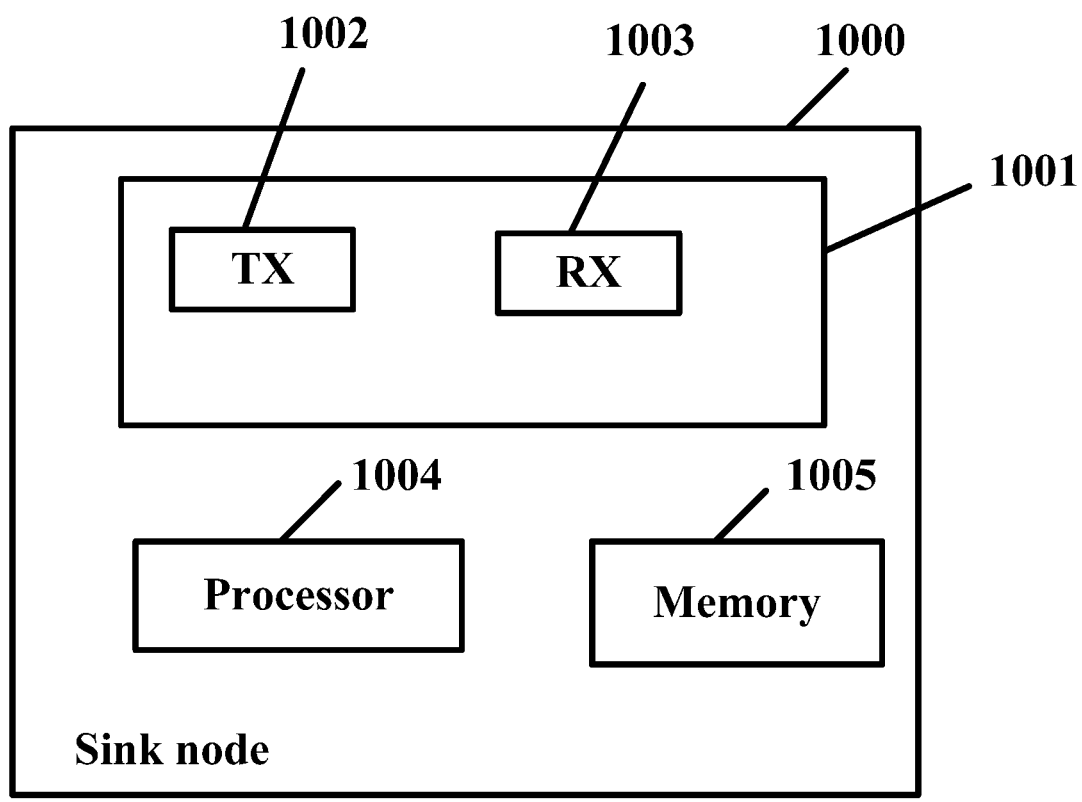
FIG. 10 is a simplified block diagram illustrating a sink node according to an embodiment of the present disclosure.

According to an aspect of the disclosure it is provided a sink node. FIG. 10 depicts a sink node 1000 useful in implementing the methods for medium access control in a wireless sensor network as described above. As shown in FIG. 10, the sink node 1000 comprises a processing device 1004, a memory 1005, and a radio modem subsystem 1001 in operative communication with the processor 1004. The radio modem subsystem 1001 comprises at least one transmitter 1002 and at least one receiver 1003. While only one processor is illustrated in FIG. 10, the processing device 1004 may comprises a plurality of processors or multi-core processor(s). Additionally, the processing device 1004 may also comprise cache to facilitate processing operations.

Computer-executable instructions can be loaded in the memory 1005 and, when executed by the processing device 1004, cause the sink node 1000 to implement the above-described methods for medium access control in a wireless sensor network. In particular, the computer-executable instructions can cause the sink node 1000 to schedule wireless resource for the source node and the relay node so that the relay node can receive and relay the sensor information sent by the source node; and combine a plurality of transmissions containing the sensor information from the source node and/or the relay node in decoding the sensor information.

In an embodiment, the computer-executable instructions, when executed by the processing device 1004, can further cause the sink node 1000 to: receive an access request including identification information of the source node.

In an embodiment, the computer-executable instructions, when executed by the processing device 1004, can further cause the sink node 1000 to: receive a relayed access request including identification information of the source node and the relay node.

In an embodiment, wherein the wireless resource may comprise a plurality of timeslots, frequencies or spread codes.

In an embodiment, the computer-executable instructions, when executed by the processing device 1004, can further cause the sink node 1000 to: notify the source node and the relay node of their scheduled wireless resources through broadcast.

In an embodiment, the computer-executable instructions, when executed by the processing device 1004, can further cause the sink node 1000 to: send an acknowledgement to the source node and/or the relay node when the sensor information is successfully decoded.

In an embodiment, wherein the relay node comprises a plurality of relay nodes.

In an embodiment, the computer-executable instructions, when executed by the processing device 1004, can further cause the sink node 1000 to select target relay nodes when receiving access requests from multiple candidate relay nodes; and broadcast the selection result.

In an embodiment, wherein hybrid automatic repeat request (HARQ) with chase combining is used to decode the sensor information.

Figure 11:
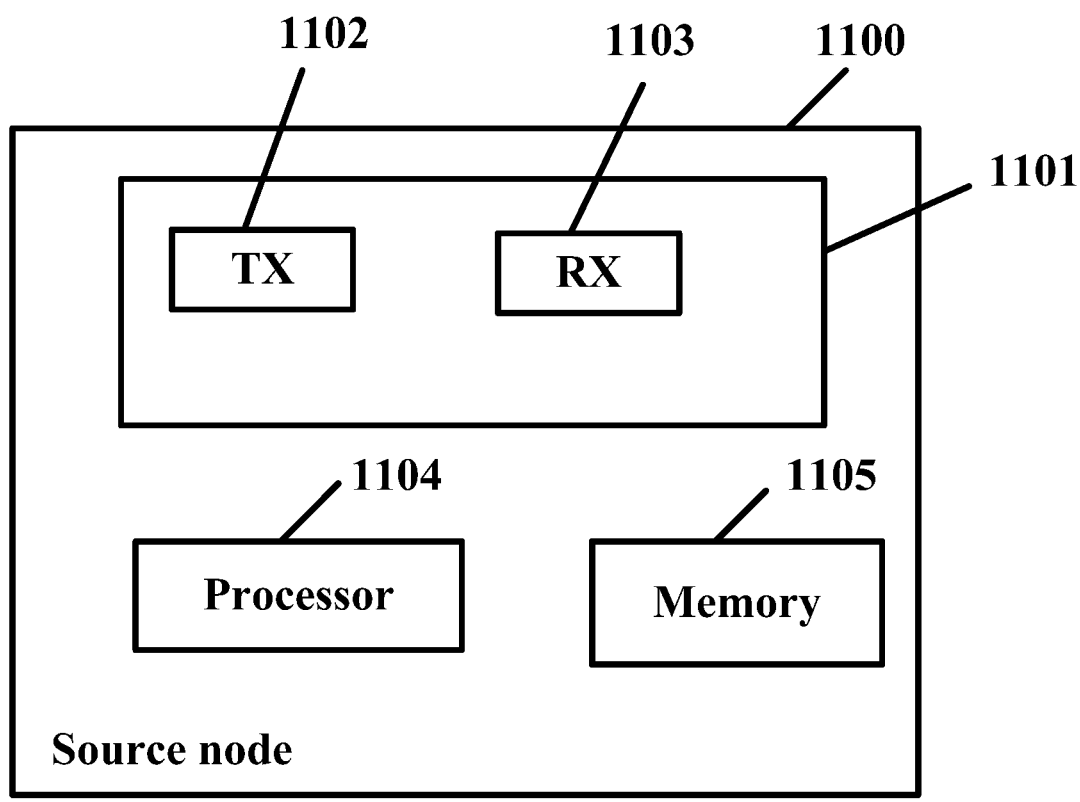
FIG. 11 is a simplified block diagram illustrating a source node according to an embodiment of the present disclosure.

According to an aspect of the disclosure it is provided a source node. FIG. 11 depicts a source node 1100 useful in implementing the methods for medium access control in a wireless sensor network as described above. As shown in FIG. 11, the source node 1100 comprises a processing device 1104, a memory 1105, and a radio modem subsystem 1101 in operative communication with the processor 1104. The radio modem subsystem 1101 comprises at least one transmitter 1102 and at least one receiver 1103. While only one processor is illustrated in FIG. 11, the processing device 1104 may comprises a plurality of processors or multi-core processor(s). Additionally, the processing device 1104 may also comprise cache to facilitate processing operations.

Computer-executable instructions can be loaded in the memory 1105 and, when executed by the processing device 1104, cause the source node 1100 to implement the above-described methods for medium access control in a wireless sensor network. In particular, the computer-executable instructions can cause the source node 1100 to receive scheduling information from the sink node, wherein the scheduling information comprises information about wireless resource scheduled to the source node; and send the sensor information with the scheduled wireless resource.

In an embodiment, the computer-executable instructions, when executed by the processing device 1104, can further cause the source node 1100 to: send an access request with normal or boosted power.

In an embodiment, wherein the access request comprises identification information of the source node.

In an embodiment, the computer-executable instructions, when executed by the processing device 1104, can further cause the source node 1100 to: receive an acknowledgement for the successful receipt of the sensor information.

In an embodiment, the computer-executable instructions, when executed by the processing device 1104, can further cause the source node 1100 to: send next sensor information after it has received the acknowledgement.

In an embodiment, the computer-executable instructions, when executed by the processing device 1104, can further cause the source node 1100 to: resend the sensor information if the acknowledgement is not received within a predetermined period of time.

In an embodiment, the computer-executable instructions, when executed by the processing device 1104, can further cause the source node 1100 to: enter into a sleeping mode.

In an embodiment, wherein the wireless resource may comprise a plurality of timeslots, frequencies or spread codes.

Figure 12:
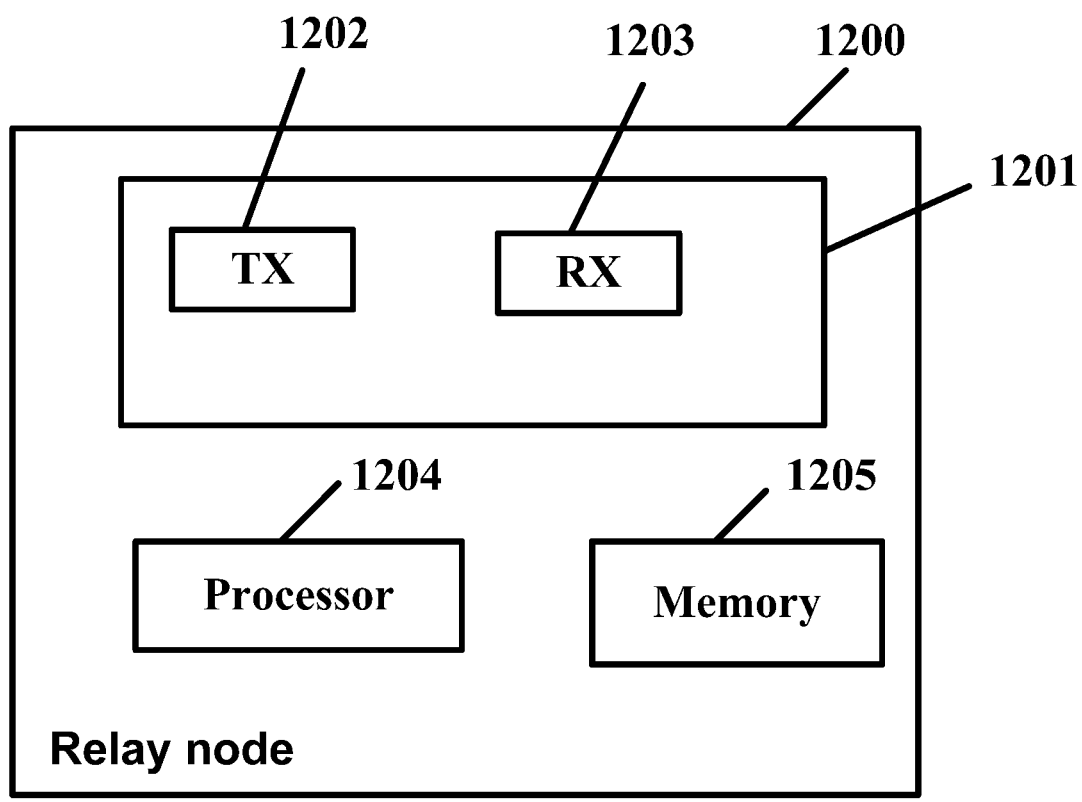
FIG. 12 is a simplified block diagram illustrating a relay node according to an embodiment of the present disclosure.

According to an aspect of the disclosure it is provided a relay node. FIG. 12 depicts a relay node 1200 useful in implementing the methods for medium access control in a wireless sensor network as described above. As shown in FIG. 12, the relay node 1200 comprises a processing device 1204, a memory 1205, and a radio modem subsystem 1201 in operative communication with the processor 1204. The radio modem subsystem 1201 comprises at least one transmitter 1202 and at least one receiver 1203. While only one processor is illustrated in FIG. 12, the processing device 1204 may comprises a plurality of processors or multi-core processor(s). Additionally, the processing device 1204 may also comprise cache to facilitate processing operations.

Computer-executable instructions can be loaded in the memory 1205 and, when executed by the processing device 1204, cause the relay node 1200 to implement the above-described methods for medium access control in a wireless sensor network. In particular, the computer-executable instructions can cause the relay node 1200 to receive scheduling information from the sink node, wherein the scheduling information comprises information about wireless resource scheduled to the source node and the relay node respectively, and receive the sensor information from the source node; and forward the sensor information to the sink node.

In an embodiment, the computer-executable instructions, when executed by the processing device 1204, can further cause the relay node 1200 to: send a first access request comprising identification information of the relay node.

In an embodiment, the computer-executable instructions, when executed by the processing device 1204, can further cause the relay node 1200 to: receive a second access request from the source node, wherein the access request comprises identification information of the source node; and forward the second access request to the sink node together with identification information of the relay node.

In an embodiment, the computer-executable instructions, when executed by the processing device 1204, can further cause the relay node 1200 to: receive an acknowledgement for the successful receipt of the sensor information.

In an embodiment, wherein the wireless resource comprises a plurality of timeslots, frequencies or spread codes.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for medium access control in a wireless sensor network, the method comprising:
    selecting, by a sink node, at least one relay node to relay sensor information from a source node, the selecting based on at least one access request received from at least one candidate relay node;
    scheduling, by the sink node, a wireless resource for the at least one relay node, so that the at least one relay node receives and relays the sensor information sent by the source node, wherein the wireless sensor network includes the source node configured to at least send the sensor information, the at least one relay node configured to at least relay the sensor information, and the sink node configured to at least receive the sensor information; and
    combining, in decoding the sensor information, a plurality of transmissions containing the sensor information from the source node and/or the at least one relay node.

2. The method according to claim 1, further comprising:
    receiving, by the sink node and before the scheduling, the at least one access request including at least one of identification information of the source node and identification information of the at least one relay node, wherein the sink node comprises or is comprised in a cellular base station, and wherein the selecting is based on at least on a latency between the sink node and the at least one relay node.

3. The method according to claim 1, further comprising:
    notifying the source node and the at least one relay node of their scheduled wireless resources through a broadcast.

4. The method according to claim 1, further comprising:
    sending an acknowledgement to the source node and/or the at least one relay node, when the sensor information is successfully decoded.

5. The method according to claim 1, further comprising:
    broadcasting the selection result.

6. A method for medium access control in a wireless sensor network, the method comprising:
    sending, by a relay node, a first access request towards a sink node, wherein the sink node comprises or is comprised in a cellular base station;
    receiving, by the relay node and in response to the first access request, scheduling information from the sink node, wherein the scheduling information includes information about wireless resource scheduled to the relay node, wherein the wireless sensor network includes the source node configured to at least send sensor information, the relay node configured to at least relay the sensor information, and the sink node configured to at least receive the sensor information; and
    sending, by the relay node, the sensor information to the sink node.

7. The method according to claim 6, wherein the first access request includes identification information of the source node and/or the relay node.

8. The method according to claim 6, further comprising
    receiving a second access request from the source node, wherein the second access request includes identification information of the source node; and
    forwarding the second access request to the sink node together with identification information of the relay node.

9. The method according to claim 6, wherein the wireless resource includes a plurality of timeslots, frequencies, or spread codes.

10. The method according to claim 6, further comprising:
    receiving the sensor information from the source node; and
    sending the sensor information to the sink node.

11. An apparatus comprising:
    at least one processor; and
    at least one memory including computer program code, the at least one memory and the computer program code configured to, with the at least one processor, cause the apparatus to at least:
        select at least one relay node to relay sensor information from a source node, the selection based on at least one access request received from at least one candidate relay node;
        schedule wireless resource for the at least one relay node, so that the at least one relay node receives and relays the sensor information sent by the source node; and
        combine, in decoding the sensor information, a plurality of transmissions containing the sensor information from the source node and/or the at least one relay node.

12. The apparatus according to claim 11, wherein the apparatus is further caused to at least receive the at least one access request including at least one of identification information of the source node and identification information of the at least one relay node, wherein the apparatus comprises or is comprised in a cellular base station, and wherein the selection is based on at least on a latency between the apparatus and the at least one relay node.

13. The apparatus according to claim 11, wherein the apparatus is further caused to at least notify the source node and the at least one relay node of their scheduled wireless resources through broadcast.

14. The apparatus according to claim 11, wherein the apparatus is further caused to at least send an acknowledgement to the source node and/or the at least one relay node, when the sensor information is successfully decoded.

15. The apparatus according to claim 11, wherein the apparatus is further caused to at least:
    broadcast the selection result.

16. A apparatus comprising:
    at least one processor; and
    at least one memory including computer program code, the at least one memory and the computer program code configured to, with the at least one processor, cause the apparatus to at least:
        send a first access request towards a sink node, wherein the sink node comprises or is comprised in a cellular base station;
        receive, in response to the first access request, scheduling information from a sink node, wherein the scheduling information includes information about wireless resource scheduled to the relay node; and send the sensor information to the sink node.

17. The apparatus according to claim 16, wherein the first access request includes identification information of the source node or the relay node.

18. The apparatus according to claim 16, wherein the apparatus is further caused to at least receive a second access request from the source node, wherein the second access request includes identification information of the source node; and wherein the apparatus is further caused to at least forward the second access request to the sink node together with identification information of the relay node.

19. The apparatus according to claim 16, wherein the apparatus is further caused to at least receive an acknowledgement for the successful receipt of the sensor information.

20. The apparatus according to claim 16, wherein the apparatus is further caused to at least receive the sensor information from the source node and sending the sensor information to the sink node.

\* \* \* \* \*